(12) United States Patent
Glockzin

(10) Patent No.: US 9,429,823 B2
(45) Date of Patent: Aug. 30, 2016

(54) BRACKET FOR CAMERA

(71) Applicant: James Glockzin, Holland, MI (US)

(72) Inventor: James Glockzin, Holland, MI (US)

(*) Notice: Subject to any disclaimer, the term of this patent is extended or adjusted under 35 U.S.C. 154(b) by 5 days.

(21) Appl. No.: 14/702,091

(22) Filed: May 1, 2015

(65) Prior Publication Data

US 2015/0323857 A1     Nov. 12, 2015

Related U.S. Application Data

(60) Provisional application No. 61/991,844, filed on May 12, 2014.

(51) Int. Cl.
| | | |
|---|---|---|
| G03B 17/56 | (2006.01) | |
| G03B 17/02 | (2006.01) | |
| G03B 17/06 | (2006.01) | |
| F16M 13/02 | (2006.01) | |

(52) U.S. Cl.
CPC ............ *G03B 17/561* (2013.01); *F16M 13/02* (2013.01); *G03B 17/02* (2013.01); *G03B 17/06* (2013.01); *Y10T 29/49948* (2015.01)

(58) Field of Classification Search
CPC .................................................. G03B 17/561
USPC ......................................... 396/153, 419–428
See application file for complete search history.

(56) References Cited

U.S. PATENT DOCUMENTS

| | | | | |
|---|---|---|---|---|
| 8,014,664 B2* | 9/2011 | Ismael | ................... | G03B 11/00 396/241 |
| 8,109,680 B2* | 2/2012 | Olien | ................... | F16M 11/041 396/428 |
| 8,836,782 B2* | 9/2014 | Barley | ................... | G03B 17/02 348/143 |
| 8,974,128 B2* | 3/2015 | Cuddeback | .......... | G03B 17/561 396/419 |
| 2011/0129210 A1* | 6/2011 | McGucken | ............ | F16M 13/02 396/422 |
| 2012/0301129 A1* | 11/2012 | Smith | ................... | G03B 17/561 396/427 |

* cited by examiner

*Primary Examiner* — WB Perkey
*Assistant Examiner* — Dennis Hancock
(74) *Attorney, Agent, or Firm* — Flynn, Thiel, Boutell & Tanis, P.C.

(57) ABSTRACT

A camera security system including a camera housing having a camera therein, a bracket assembly and at least one non-standard fastener. The bracket assembly has at least two bracket members including a first bracket member configured to be securely connected to a second bracket member, with the bracket assembly securely receiving the camera housing therein such that the camera is exposed, but the camera cannot be removed from the bracket. The at least one non-standard fastener connects the first bracket member to the second bracket member. The first bracket member can be disconnected from the second bracket member by removing the at least one non-standard fastener to thereby allow the camera to be removed from the bracket assembly.

21 Claims, 6 Drawing Sheets

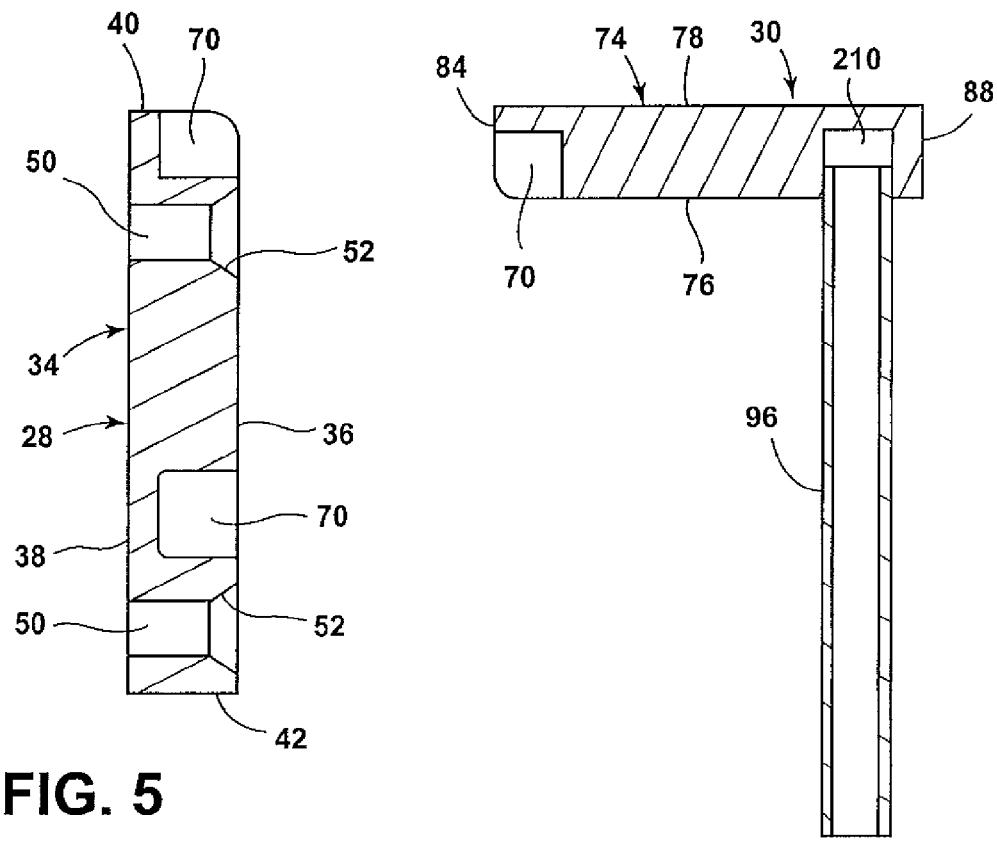
FIG. 5
FIG. 6
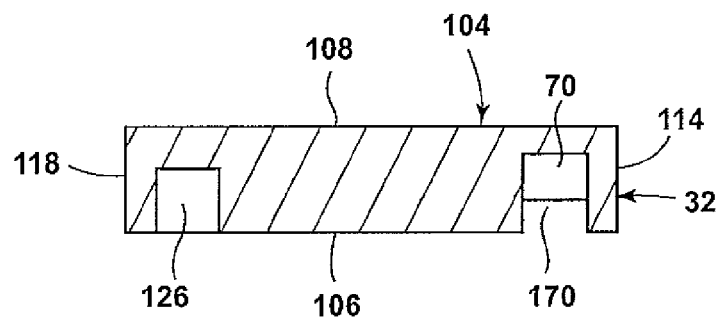
FIG. 7

BRACKET FOR CAMERA

CROSS REFERENCE TO RELATED APPLICATION

This claims the benefit of U.S. Provisional Application U.S. Ser. No. 61/991,844, filed on May 12, 2014, the disclosure of which is hereby incorporated by reference in its entirety.

FIELD OF THE INVENTION

The present invention concerns a bracket, and more particularly relates to a bracket for a camera.

BACKGROUND OF THE INVENTION

Motion sensor cameras are used in the wild to take pictures of animals that pass by the cameras. The motion sensor cameras sense the motion of the animals passing by the camera and quickly take a picture of the animals. The motion sensor cameras can be equipped with a flash for taking pictures of the animals in low light. Typically, the motion sensor cameras are connected to a tree and can be held by the tree using a strap that surrounds the tree and connects to or passes through openings in the motion sensor camera. However, the straps do not always stably support the motion sensor camera and are easily removed, thereby allowing the motion sensor camera to be stolen.

A support system for a motion sensor camera is desired.

SUMMARY OF THE INVENTION

An aspect of the present invention is to provide a camera security system including a camera housing having a camera therein, a bracket assembly and at least one non-standard fastener. The bracket assembly has at least two bracket members including a first bracket member configured to be securely connected to a second bracket member, with the bracket assembly securely receiving the camera housing therein such that the camera is exposed, but the camera cannot be removed from the bracket. The at least one non-standard fastener connects the first bracket member to the second bracket member. The first bracket member can be disconnected from the second bracket member by removing the at least one non-standard fastener to thereby allow the camera to be removed from the bracket assembly.

Yet another aspect of the present invention is to provide a method of securely mounting a camera housing having a camera to a support comprising providing a bracket assembly having at least two bracket members including a first bracket member configured to be securely connected to a second bracket member, securing the first bracket member to the support, receiving the camera housing within the bracket assembly such that the camera is exposed, engaging the second bracket member with the first bracket member, and connecting the first bracket member to the second bracket member with at least one non-standard fastener.

Another aspect of the present invention is to provide a secure camera bracket comprising a rear bracket member, a left bracket member and a right bracket member. The rear bracket member includes a rear block having a plurality of first camera receiving recesses, a left fastener opening and a right fastener opening. The left bracket member includes a left block having a plurality of second camera receiving recesses, a first fastener opening and a left tube receiving slot. The right bracket member includes a right block having a plurality of third camera receiving recesses, a second fastener opening and a right tube receiving slot. The left bracket member is connected to the rear bracket member by a first non-standard fastener extending through the first fastener opening of the left block and into the left fastener opening of the rear block. The right bracket member is connected to the rear bracket member by a second non-standard fastener extending through the second fastener opening of the right block and into the right fastener opening of the rear block. A tube extends between the right bracket member and the left bracket member, with the tube being partially located in the left tube receiving slot and the right tube receiving slot.

BRIEF DESCRIPTION OF DRAWINGS

FIG. 5 is a cross-sectional view of a rear bracket member of the bracket of the present invention taken along line V-V of FIG. 4.

FIG. 6 is a cross-sectional view of a left bracket member of the bracket of the present invention taken along line VI-VI of FIG. 4.

FIG. 7 is a cross-sectional view of a right bracket member of the bracket of the present invention taken along line VII-VII of FIG. 4.

DETAILED DESCRIPTION OF PREFERRED EMBODIMENTS

It is to be understood that the invention as described herein may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
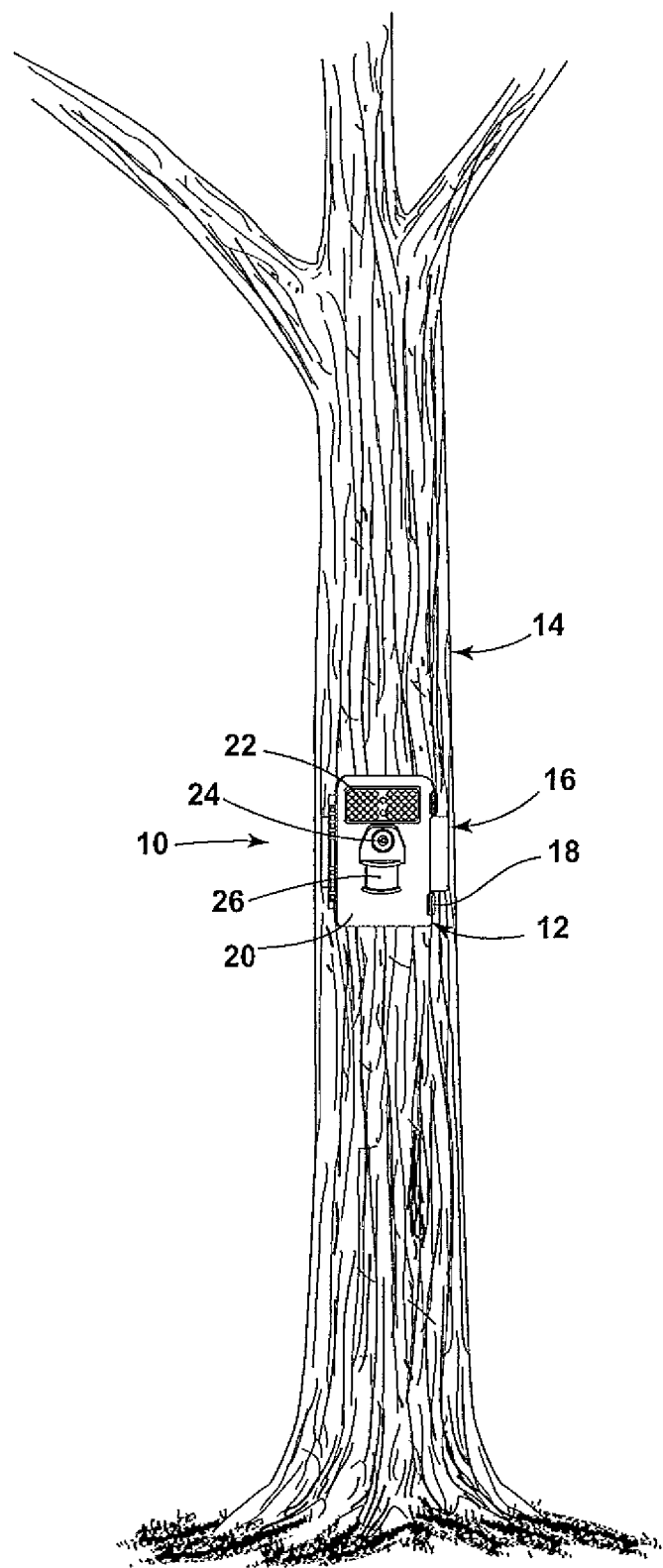
FIG. 1 is a front view of a bracket of the present invention holding a motion sensor camera to a tree.

The reference number 10 (FIG. 1) generally designates a camera security system of the present invention. The illustrated camera security system 10 includes a motion sensor camera 12 held to a tree 14 by a bracket 16 of the present invention. The motion sensor camera 12 includes a housing 18 having front panel 20 with a flash 22, a camera lens 24 and a motion sensor 26 extending therefrom or therethrough. The motion sensor camera 12 takes pictures when the motion sensor 26 is activated. The motion sensor camera 12 as illustrated and described herein is used for illustrative purposes only and any commercial motion sensor camera 12 could be used with the bracket 16.

The illustrated bracket 16 of the present invention securely holds the motion sensor camera 12 to the tree 14. The bracket 16 includes a rear bracket member 28, a left bracket member 30 and a right bracket member 32. The rear bracket member 28, the left bracket member 30 and the right bracket member 32 securely hold the motion sensor camera 12 when connected together. The rear bracket member 28 securely connects to the tree 14 (or other appropriate support) and the left bracket member 30 and the right bracket member 32 capture the motion sensor camera 12 when the bracket 16 is assembled.

In the illustrated example, the rear bracket member 28 connects to the tree 14, the left bracket member 30 and the right bracket member 32. The rear bracket member 28 is a block 34 and includes a substantially rectangular front face 36, a substantially rectangular rear face 38, a top side 40, a bottom side 42, a left side 44 and a right side 48. The block 34 can be made out of any material (e.g., wood, metal, plastic or a combination thereof). As discussed in more detail below, the block 34 includes a plurality of camera projection receiving recesses 70 for receiving projections 72 extending from the motion sensor camera 12 to allow the motion sensor camera 12 to be flush against the block 34.

The illustrated block 34 includes at least one connection hole 50 extending therethrough from the front face 36 to the rear face 38. Each connection hole 50 can include a countersink 52 or a counterbore at the front face 36 of the block 34. Each connection hole 50 is configured to receive a standard fastener 54 therethrough, with the standard fastener 54 extending into the tree 14 to connect the rear bracket member 28 to the tree 14. The standard fastener 54 can include a head 56 that is received into the countersink 52 or counterbore for the connection hole 50 for allowing the head 56 of the standard fastener 54 to be flush with the front face 36 of the block 34 so as to not interfere with the motion sensor camera 12 when the motion sensor camera 12 abuts the block 34. As used herein, "standard fastener" means a screw that has a flat blade-type slot or a Phillips slot or any fastener that does not need a special tool to use (e.g., a nail). It is contemplated that the block 34 of the rear bracket member 28 could be connected to the tree 14 by other methods. The left side 44 of the block 34 includes a left side threaded opening 62 for accepting a left side non-standard fastener 64 therein for connecting the left bracket member 30 to the rear bracket member 28. Likewise, the right side 48 of the block 34 includes a right side threaded opening 66 for accepting a right side non-standard fastener 68 therein for connecting the right bracket member 32 to the rear bracket member 28.

In the illustrated example, the left bracket member 30 connects to the rear bracket member 28 and helps to hold the motion sensor camera 12 within the bracket 16. The left bracket member 30 is a block 74 and includes a substantially rectangular inside face 76, a substantially rectangular outside face 78, a top side 80, a bottom side 82, a front side 84 and a rear side 88. The block 74 can be made out of any material (e.g., wood, metal, plastic or a combination thereof). It is contemplated that the block 74 could have a level bubble tube 58 in a recess 60 in the inside face 76 of the block 74 to assist in levelling the bracket 16 while connecting the bracket 16 to the tree 14. As discussed in more detail below, the block 74 includes a plurality of the camera projection receiving recesses 70 for receiving projections 72 extending from the motion sensor camera 12 to allow the motion sensor camera 12 to be flush against the block 74.

The illustrated block 74 includes at least one connection hole 90 extending therethrough from the outside face 78 to the inside face 76. Each connection hole 90 can include a countersink 92 or a counterbore at the outside face 78 of the block 74. Each connection hole 90 is configured to receive the left side non-standard fastener 64 therethrough from the outside face 78, with the left side non-standard fastener 64 extending into the left side threaded opening 62 in the left side 44 of the block 34 of the rear bracket member 28 for connecting the left bracket member 30 to the rear bracket member 28. The left side non-standard fastener 64 can include a head 94 that is received into the countersink 92 or counterbore for the connection hole 90 for allowing the head 94 of the left side non-standard fastener 64 to be flush with the outside face 78 of the block 74. As used herein, a "non-standard fastener" means a screw that has a slot other than a flat blade-type slot or a Phillips slot such that a special tool is needed to rotate the non-standard fastener. For example, the non-standard fastener could include a slot having any non-standard pattern (e.g., square, hex socket (Allen), torx, tri-wing, torq-set, spanner head, double-square, triple square, polydrive, spline drive, double hex, Bristol, and pentalobular). The block 74 includes a tube 96 extending perpendicularly out of the inside face 76 thereof, with the tube 96 being configured to extend into the right bracket member 32 and to hold the motion sensor camera 12 as discussed in more detail below.

In the illustrated example, the right bracket member 32 connects to the rear bracket member 28 and helps to hold the motion sensor camera 12 within the bracket 16. The right bracket member 32 is a block 104 and includes a substantially rectangular inside face 106, a substantially rectangular outside face 108, a top side 110, a bottom side 112, a front side 114 and a rear side 118. The block 104 can be made out of any material (e.g., wood, metal, plastic or a combination thereof). As discussed in more detail below, the block 104 includes a plurality of the camera projection receiving recesses 70 for receiving projections 72 extending from the motion sensor camera 12 to allow the motion sensor camera 12 to be flush against the block 104. The block 104 also includes a right tube receiving recess 126 for receiving an end of the tube 96 therein when the right bracket member 32 is connected to the rear bracket member 28.

The illustrated block 104 includes at least one connection hole 120 extending therethrough from the outside face 108 to the inside face 106. Each connection hole 120 can include a countersink 122 or a counterbore at the outside face 108 of the block 104. Each connection hole 120 is configured to receive the right side non-standard fastener 68 therethrough from the outside face 108, with the right side non-standard fastener 68 extending into the right side threaded opening 66 in the right side 48 of the block 34 of the rear bracket member 28 for connecting the right bracket member 32 to the rear bracket member 28. The right side non-standard fastener 68 can include a head 124 that is received into the countersink 122 or counterbore for the connection hole 120 for allowing the head 124 of the right side non-standard fastener 68 to be flush with the outside face 108 of the block 104.

In the illustrated example, the bracket 16 is connected to the tree 14 (or other support) by first connecting the rear bracket member 28 to the tree 14 (or other support). As outlined above, the rear bracket member 28 is connected to the tree 14 (or other support) by inserting the standard fasteners 54 through the connection holes 50 and screwing (or otherwise inserting) the standard fasteners 54 into the tree 14 (or other support). One of the left bracket member 30 or the right bracket member 32 can be connected to the rear bracket member 28 before or after the rear bracket member 28 is connected to the tree 14 (or other support). However, one of the left bracket member 30 or the right bracket member 32 must remain unattached to the rear bracket member 28 after the rear bracket member 28 is connected to the tree 14 (or other support) and before the motion sensor camera 12 is positioned in place on the rear bracket member 28. It is contemplated that the rear bracket member 28 could be made integral with one of the left bracket member 30 or the right bracket member 32 without any need for the non-standard fastener 64, 68 connecting the rear bracket member 28 to the integrally connected bracket member.

Figure 8:
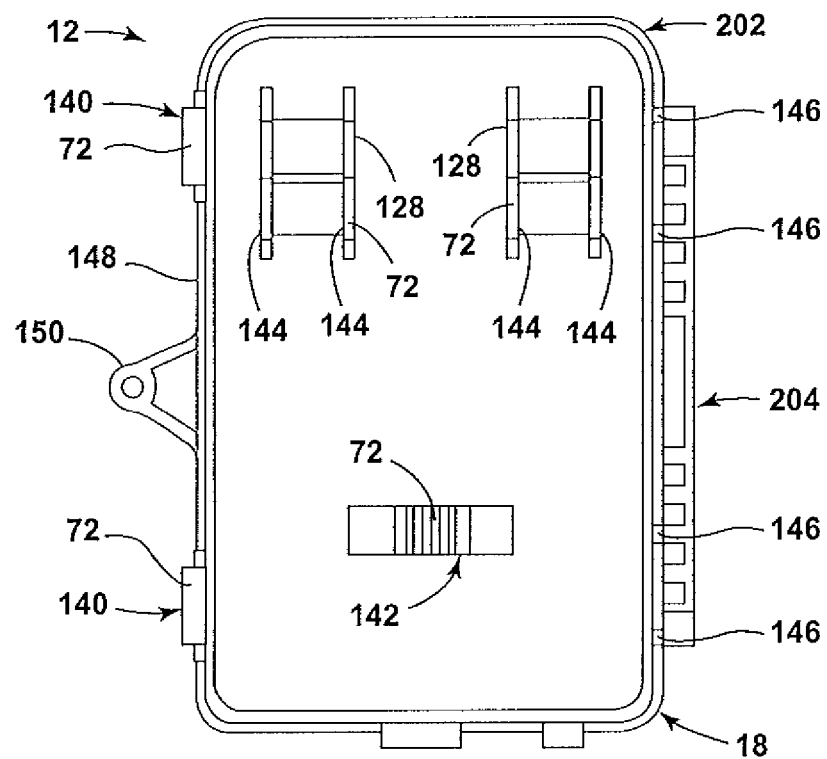
FIG. 8 is a rear view of a camera configured to be held by the bracket of the present invention.
Figure 9:
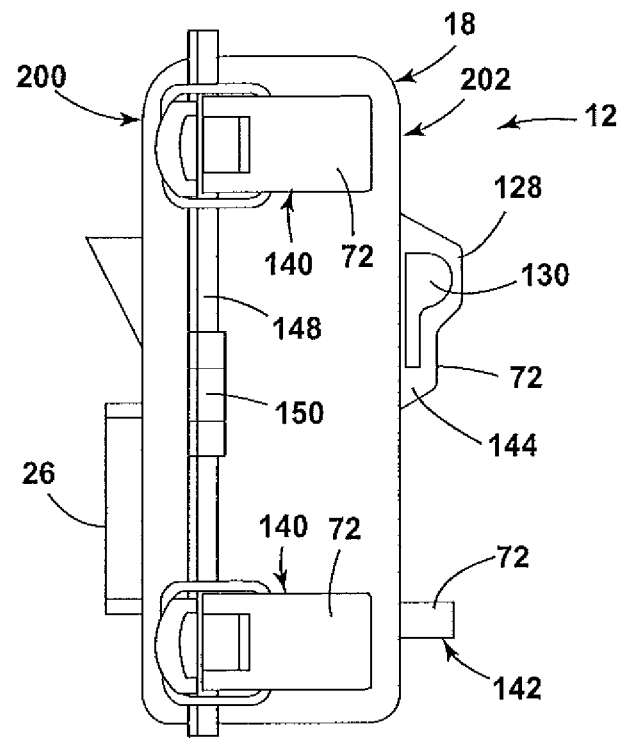
FIG. 9 is a side view of a camera configured to be held by the bracket of the present invention.

Once the illustrated rear bracket member 28 and either the left bracket member 30 or the right bracket member 32 are connected together and connected to the tree 14 (or other support), the motion sensor camera 12 can be connected to the bracket 16. FIGS. 8 and 9 illustrate a typical motion sensor camera 12 that can be used with the bracket 16 of the present invention. The housing 18 of the motion sensor camera 12 includes a front housing member 200 and a rear housing member 202 connected together. The front housing member 200 is connected to the rear housing member 202 by a hinge 204, with a rim 148 being formed at the intersection of the front housing member 200 and the rear housing member 202. A pair of clasps 140 can be used to maintain the front housing member 200 against the rear housing member 202 to keep the housing 18 and everything therein from exposure. The typical motion sensor camera 12 includes a pair of rear connection extensions 128 extending rearwardly from the rear face of the rear housing member 202. As illustrated in FIG. 9, the rear connection extensions 128 each include a slot 130. During typical use of the motion sensor camera 12, a belt is wrapped around the tree 14 and passed through the slots 130 to connect the motion sensor camera 12 to the tree 14. In the present case, the slots 130 are used to fixedly maintain the motion sensor camera 12 within the bracket 16.

In the illustrated example, the motion sensor camera 12 is connected to the bracket 16 by sliding the tube 96 through the slots 130 in the rear connection extensions 128 extending from the rear of the housing 18 of the motion sensor camera 12. The tube 96 can be connected to the left bracket member 30 or the right bracket member 32 connected to the rear bracket member 28 during use. For example, the tube 96 can be nailed or otherwise fixed in a left tube receiving recess 210 in the left bracket member 30 or the right tube receiving recess 126 of the right bracket member 32. If the tube 96 is fixed to the bracket member that is connected to the rear bracket member 28, the motion sensor camera 12 is slid laterally onto the bracket 16.

The illustrated motion sensor camera 12 may have projections 72 that need to be accommodated during connection of the motions sensor camera 12 to the bracket 16. For example, the motion sensor camera 12 may need to be tilted such that the front panel 20 of the housing 18 of the motion sensor camera 12 is not vertical while the motion sensor camera 12 is slid onto the tube 96. In the illustrated motion sensor camera 12, the rear housing 202 of the motion sensor camera 12 may include bottom flanges 144 of the rear connection extensions 128 and a bottom levelling bar 142 that extends rearwardly from the rear housing member 202. After the housing 18 of the motion sensor camera 12 is fully slid onto the tube 96, the bottom of the motion sensor camera 12 is rotated downward and the bottom flanges 144 and the bottom levelling bar 142 can extend into the camera projection recesses 70 in the block 34 of the rear bracket member 28. Furthermore, if the left bracket member 30 is connected to the rear bracket member 28, hinge extensions 146 of the housing 18 of the motion sensor camera 12 can extend into the camera projection recesses 70 in the block 74 of the left bracket member 30.

Figure 2:
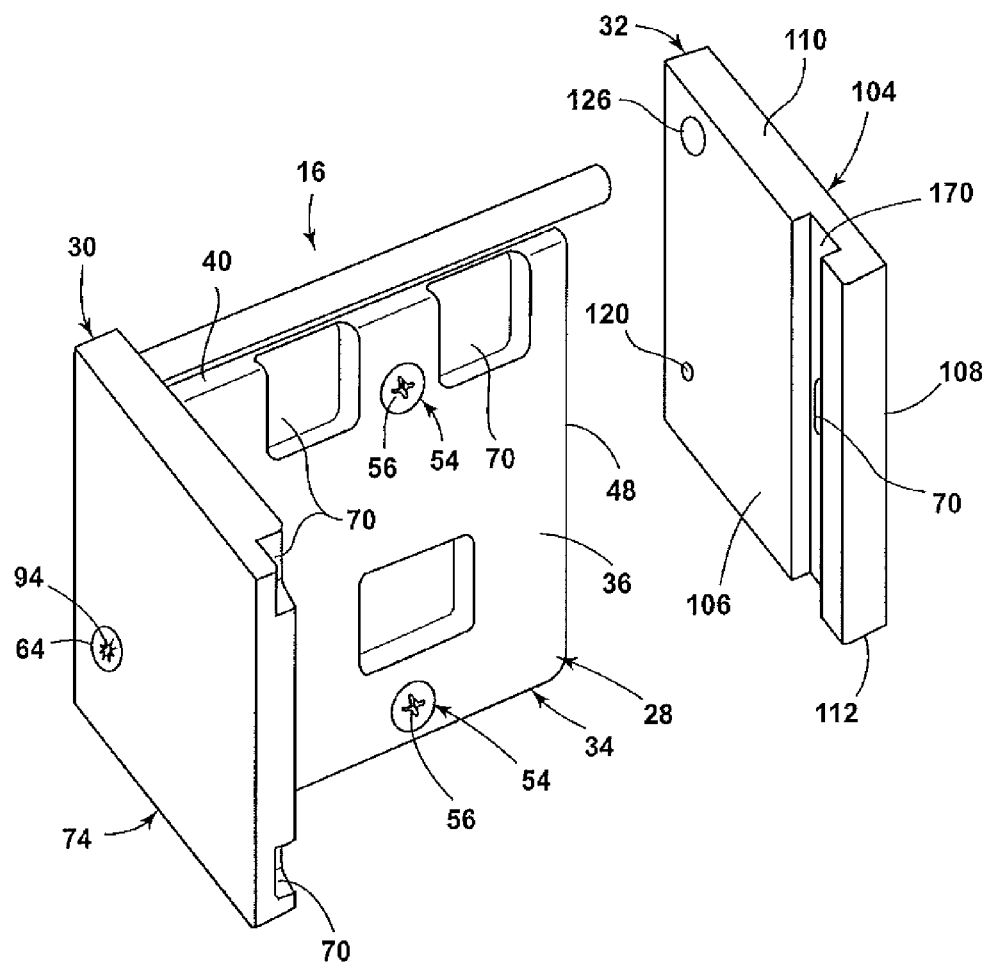
FIG. 2 is an exploded perspective view of the bracket of the present invention.
Figures 3, 4:
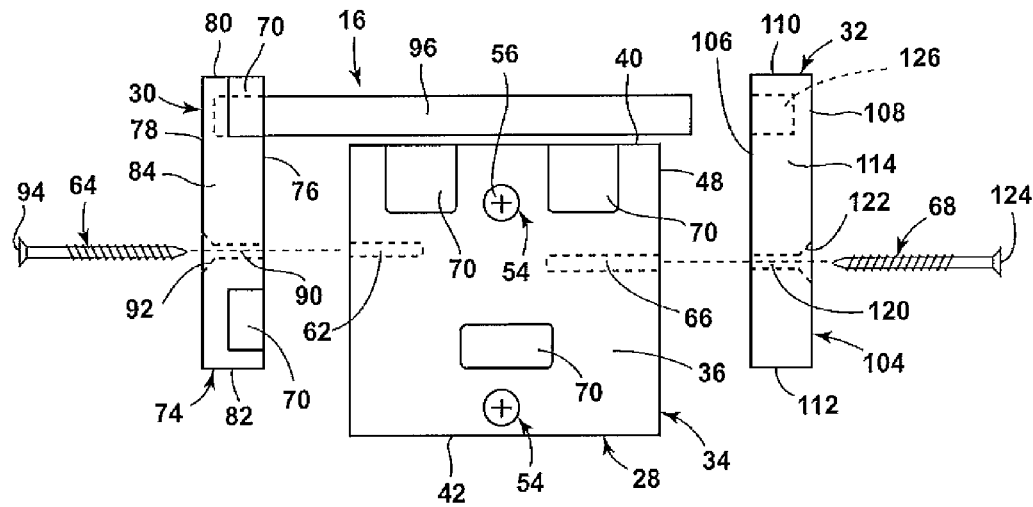
FIG. 3 is a first exploded front view of the bracket of the present invention.
FIG. 4 is a second exploded front view of the bracket of the present invention.

After the illustrated motion sensor camera 12 is in place against the rear bracket member 28 and the left bracket member 30 in the illustrated embodiment, the right bracket member 32 is connected to the rear bracket member 28. During connection of the right bracket member 32 to the rear bracket member 28, the tube 96 is slid into the right tube receiving recess 126 of the right bracket member 32. In order to prevent the housing 18 of the motion sensor camera 12 from being opened, one of the left bracket member 30 and the right bracket member 32 should cover the rim 148 of the housing 18 to prevent the front housing member 200 from being pivoted relative to the rear housing member 202. As illustrated in FIGS. 2, 4 and 7, the block 104 of the right bracket member 32 includes a vertically aligned rim receiving slot 170. As the right bracket member 32 is brought into engagement with the rear bracket member 28, the vertically aligned rim receiving slot 170 will receive the rim 148 of the housing 18 of the motion sensor camera 12 therein, thereby preventing the housing 18 from being opened. The vertically aligned rim receiving slot 170 can include one of the camera projection recesses 70 therein for receiving a lock hole extension 150 extending from the rim 148 (which is used to receive a lock to maintain the rear housing member 202 against the front housing member 200 when the bracket 16 of the present invention is not used). After the right bracket member 32 is brought into engagement with the rear bracket member 28, the right side non-standard fastener 68 is inserted through the connection hole 120 in the block 104 of the right bracket member 32 and into the right side threaded opening 66.

In the illustrated example, only the left side non-standard fastener 64 and the right side non-standard fastener 68 are exposed while the bracket 16 is connected to the tree 14 (or other support). Therefore, a special tool is needed to open the bracket 16 to access the motion sensor camera 12 therein because of the non-standard fasteners. In the present embodiment, the bracket 16 is small and holds the motion sensor camera 12 close to the mounting surface (e.g., tree 14) for concealment. Since the bracket 16 holds the housing 18 closed, no padlock is needed. The bracket 16 can be positioned in a desired location all year and the motion sensor camera 12 only added when desired.

Figure 10A:
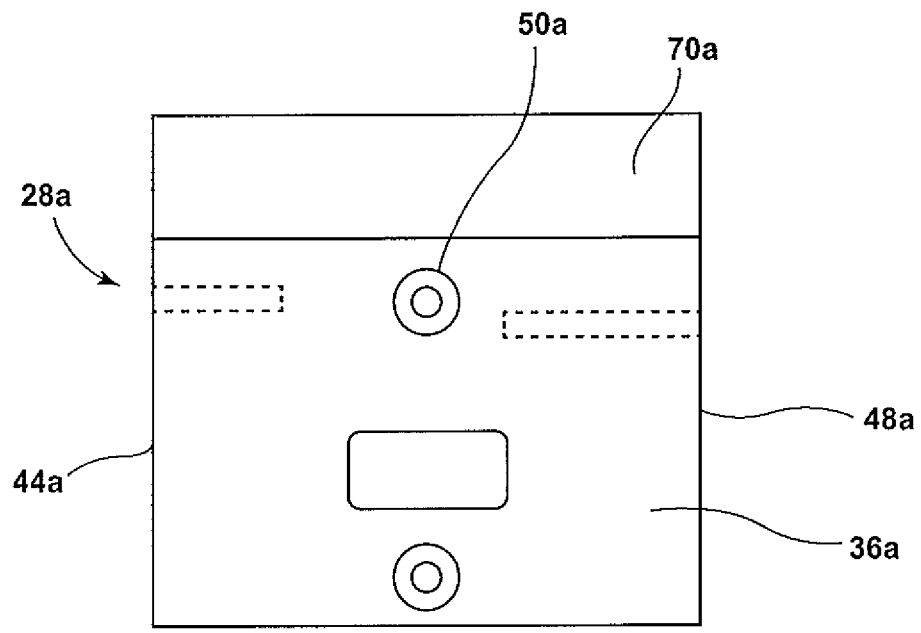
FIG. 10A is a front view of a second embodiment of the rear bracket member of the bracket of the present invention.
Figure 10B:
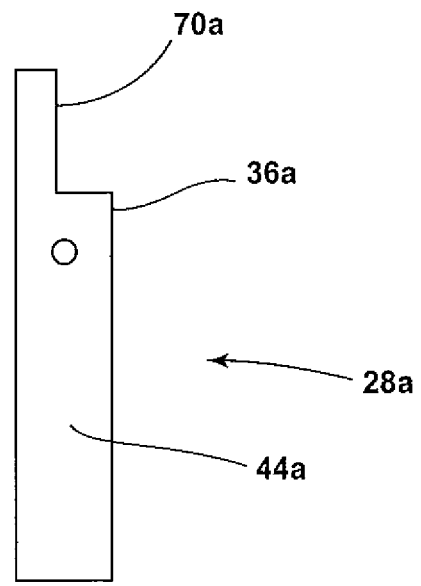
FIG. 10B is a side view of the second embodiment of the rear bracket member of the bracket of the present invention.

FIGS. 10A and 10B illustrate a second embodiment of the rear bracket member 28a of the bracket 16. In the second embodiment of the rear bracket member 28a, the plurality of camera projection receiving recesses are combined into a single camera projection receiving recess 70a that extends along the entire front face 36a from the left side 44a and the right side 48a of the rear bracket member 28a. To accommodate the single camera projection receiving recess 70a, the top connection hole 50a is moved down.

It is to be understood that variations and modifications can be made on the aforementioned structure without departing from the concepts of the present invention. For example, it is contemplated that the left bracket member 30 or the right bracket member 32 could be connected to the tree 14 (or other support) to have a camera positioned at a right angle to the surface of the tree 14 (or other support), but still with only a single non-standard fastener exposed for opening the bracket 16. Further, it is to be understood that such concepts are intended to be covered by the following claims unless these claims by their language expressly state otherwise.

I claim:

1. A camera security system comprising:
a camera housing having a camera therein;
a bracket assembly having at least two bracket members including a first bracket member configured to be securely connected to a second bracket member, the bracket assembly securely capturing the camera housing therein with the camera being exposed, but the camera cannot be removed from the bracket assembly;
at least one non-standard fastener connecting the first bracket member to the second bracket member;
wherein the first bracket member can be disconnected from the second bracket member by removing the at least one non-standard fastener to thereby allow the camera to be removed from the bracket assembly; and
wherein the camera housing cannot be removed from the bracket assembly until the first bracket member is disconnected from the second bracket member.

2. The camera security system of claim 1, wherein:
the camera housing further includes a motion sensor.

3. The camera security system of claim 2, wherein:
the camera housing further includes a flash.

4. The camera security system of claim 1, wherein:
the at least two bracket members comprise three bracket members including the first bracket member, the second bracket member and a third bracket member.

5. The camera security system of claim 4, wherein:
the first bracket member includes a rear block having a left fastener opening and a right fastener opening;
the second bracket member includes a left block having a first fastener opening and a left tube receiving slot; and
the third bracket member includes a right block having a second fastener opening and a right tube receiving slot;
the second bracket member is connected to the first bracket member by the at least one non-standard fastener extending through the first fastener opening of the left block and into the left fastener opening of the rear block;
the third bracket member is connected to the first bracket member by the at least one non-standard fastener extending through the second fastener opening of the right block and into the right fastener opening of the rear block; and
a tube extends between the second bracket member and the third bracket member, with the tube being partially located in the left tube receiving slot and the right tube receiving slot.

6. The camera security system of claim 5, wherein:
the camera housing includes a plurality of projections extending into camera receiving projections in the rear block, the left block and the right block.

7. The camera security system of claim 5, wherein:
the tube extends through slots of the camera housing.

8. The camera security system of claim 1, wherein:
the bracket assembly includes a level therein for levelling the camera security system.

9. The camera security system of claim 1, wherein:
the camera housing includes a rear housing section pivoted to a front housing section; and
the bracket assembly prevents the front housing section from being pivoted relative to the rear housing section.

10. The camera security system of claim 9, wherein:
the camera housing includes an extended rim at an intersection of the rear housing section and the front housing section; and
the second bracket member includes a slot receiving the extended rim therein for preventing the front housing section from being pivoted relative to the rear housing section.

11. A method of securely mounting a camera housing having a camera to a support comprising:
providing a bracket assembly having at least two bracket members including a first bracket member configured to be securely connected to a second bracket member;
securing the first bracket member to the support;
capturing the camera housing within the bracket assembly with the camera being exposed;
engaging the second bracket member with the first bracket member; and
connecting the first bracket member to the second bracket member with at least one non-standard fastener; and
wherein the camera housing cannot be removed from the bracket assembly until the first bracket member is disconnected from the second bracket member.

12. The method of claim 11, further including:
providing the camera with a motion sensor.

13. The method of claim 12, further including:
providing the camera housing with a flash.

14. The method of claim 11, wherein:
the at least two bracket members comprise three bracket members including the first bracket member, the second bracket member and a third bracket member.

15. The method of claim 14, wherein:
the first bracket member includes a rear block having a left fastener opening and a right fastener opening;
the second bracket member includes a left block having a first fastener opening and a left tube receiving slot; and
the third bracket member includes a right block having a second fastener opening and a right tube receiving slot;
and further including:
connecting the second bracket member to the first bracket member by extending the at least one non-standard fastener through the first fastener opening of the left block and into the left fastener opening of the rear block;
connecting the third bracket member to the first bracket member by extending the at least one non-standard fastener through the second fastener opening of the right block and into the right fastener opening of the rear block; and
extending a tube between the second bracket member and the third bracket member by locating the tube in the left tube receiving slot and the right tube receiving slot.

16. The method of claim 15, further including:
providing the camera housing with a plurality of projections; and
extending the plurality of projections into camera receiving projections in the rear block, the left block and the right block.

17. The method of claim 15, further including:
extending the tube through slots of the camera housing.

18. The method of claim 11, further including:
providing the bracket assembly with a level therein for levelling the camera.

19. The method of claim 11, further including:
providing the camera housing with a rear housing section pivoted to a front housing section, and an extended rim at an intersection of the rear housing section and the front housing section; and
positioning the extending rim in a slot in the second bracket member for preventing the front housing section from being pivoted relative to the rear housing section.

20. A secure camera bracket comprising:
a rear bracket member including a rear block having a plurality of first camera receiving recesses, a left fastener opening and a right fastener opening;
a left bracket member including a left block having a plurality of second camera receiving recesses, a first fastener opening and a left tube receiving slot; and
a right bracket member including a right block having a plurality of third camera receiving recesses, a second fastener opening and a right tube receiving slot;
the left bracket member being connected to the rear bracket member by a first non-standard fastener extending through the first fastener opening of the left block and into the left fastener opening of the rear block;
the right bracket member being connected to the rear bracket member by a second non-standard fastener extending through the second fastener opening of the right block and into the right fastener opening of the rear block;
wherein a tube extends between the right bracket member and the left bracket member, with the tube being partially located in the left tube receiving slot and the right tube receiving slot.

21. The secure camera bracket of claim 20, wherein:
one of the left bracket member and the right bracket member includes a level therein for levelling a camera in the secure camera bracket.

\* \* \* \* \*